United States Patent [19]
Chung

[11] Patent Number: 5,091,242
[45] Date of Patent: Feb. 25, 1992

[54] CARBON FIBER COMPOSITES HAVING IMPROVED FATIGUE RESISTANCE

[75] Inventor: Deborah D. L. Chung, Pittsburgh, Pa.

[73] Assignee: The Research Foundation of State Univ. of N.Y., Albany, N.Y.

[21] Appl. No.: 605,645

[22] Filed: Oct. 30, 1990

[51] Int. Cl.⁵ .............................................. B32B 33/00
[52] U.S. Cl. .................................... 428/237; 428/328; 428/242; 428/263; 428/283; 428/408; 428/902
[58] Field of Search ............... 428/285, 344, 328, 224, 428/237

[56] References Cited

U.S. PATENT DOCUMENTS

| | | | |
|---|---|---|---|
| 4,157,409 | 6/1979 | Levitt et al. | 427/299 |
| 4,689,098 | 8/1987 | Gaughan | 428/285 |
| 4,815,940 | 3/1989 | Leshane et al. | 416/241 |
| 4,888,247 | 12/1989 | Zweben et al. | 428/285 |

OTHER PUBLICATIONS

Keiichi Kuniya & Hideo Arakawa, Development of a Copper-Carbon Fiber Composite, Compos. '86: Recent Adv. Jpn. U.S., Proc. Jpn. -U.S. Conf. Compos. Mater. 3rd, 465-72.

Carbon Fibers, 31st Int. SAMPE Symposium Apr. 7-10, 1986.

David G. Gelderloos, *Squeeze casting of carbon fibre-tin alloy composites,* Journal of Materials Science Letters 3 (1984) 232-238.

Primary Examiner—George F. Lesmes
Assistant Examiner—Richard P. Weisberger

[57] ABSTRACT

A composite article comprising a resin matrix containing both carbon fibers and a tin alloy. In the preferred embodiment, fiber containing layers within the matrix are separated by alloy containing layers within the matrix.

The invention further includes the method of manufacturing the composite articles by impregnating layers of carbon fibers with a resin to form impregnated sheets, spreading alloy powder between the sheets and compression molding the resulting article at a sufficient temperature and pressure for a sufficient time to melt the alloy and cure the resin.

16 Claims, 5 Drawing Sheets

FIG.2(a)
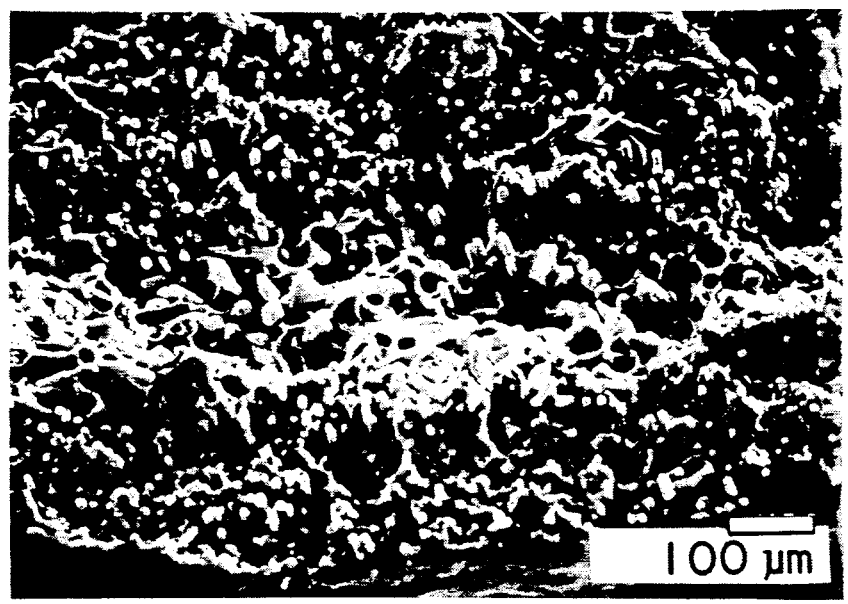
FIG.2(b)

FIG.4(a)
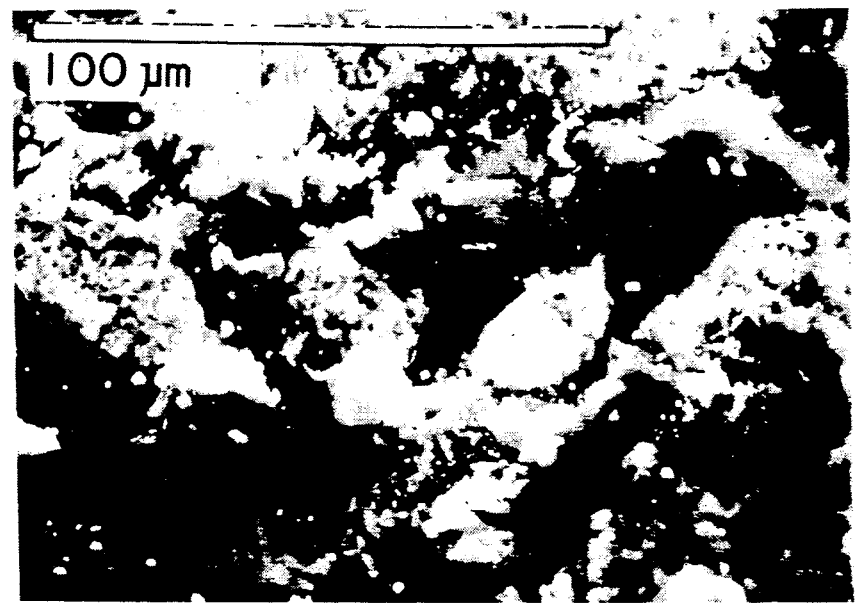
FIG.4(b)

CARBON FIBER COMPOSITES HAVING IMPROVED FATIGUE RESISTANCE

BACKGROUND OF THE INVENTION

Various and numerous plastic polymer (resin) materials are known which are reinforced with carbon fibers. Such composite materials are desirable where good strength properties and lightweight are required, for example in the manufacture of airframes.

Unfortunately, while initial physical properties of such composites can be very good, such composites are subject to fatigue damage which can lead to catastrophic failure. Such failure cannot, of course, be tolerated in such applications as airframes.

Fiber composites of other materials, such as lead-tin alloys are known, e.g., as described in "The Fracture Mechanisms of Carbon Fiber Reinforced Pb-Sn Composite Material", Chengfu et al., July 1987, 6th International Conference on Composite Materials and 2nd European Conference on Composite Materials (ICCM & ECCM), Vol. 2, 2.183–2.188, Elsevier Applied Science Publishers Ltd., London, England.

Such composites are nevertheless subject to stress fracture and are of course very dense and are therefore completely unsuitable for use in major structural components of aircraft.

BRIEF DESCRIPTION OF THE DRAWINGS

FIG. 2 shows a fracture surface after tensile testing of a composite of the invention containing 22.9 wt.% alloy (1.8 vol.% alloy). (a) shows a low magnification image of almost the entire cross-sectional thickness of the composite specimen. (b) shows a high magnification image of the alloy particles in the alloy layer in the middle strip of (a).

FIG. 4 shows a fracture surface after fatigue testing of a composite of the invention containing 32.9 wt.% alloy (4.1 vol.% alloy). (a) shows a part of the alloy layer, which is the middle layer of the composite. (b) shows a part of a fiber layer.

BRIEF DESCRIPTION OF THE INVENTION

Figure 1:
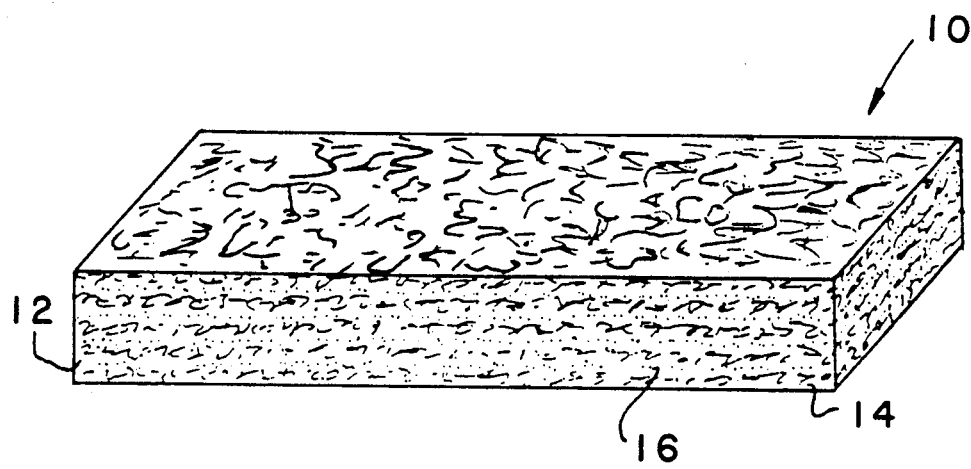
FIG. 1 shows a cross-sectional perspective view of a composite of the invention.

It has now been surprisingly discovered that the fatigue resistance of resin-carbon fiber composites can be dramatically improved by incorporating tin alloy into the plastic matrix along with the carbon fibers. The addition of the alloy has been found to surprisingly increase the fatigue life by as much as over 100 times a similar composite which does not incorporate the alloy, while having little or no negative effect upon the strength and modulus of the composite. Also, because the tin alloy comprises from as low as 5 to usually no more than 50 weight percent of the composite, density of the composite may be kept low enough to permit the composite to be used in lightweight applications.

In its most preferred form, tin-lead alloy particles are incorporated into the resin matrix in layers between carbon fiber layers.

In accordance with the invention, there is therefore provided a composite article comprising a resin matrix containing both carbon fibers and a tin alloy. In the preferred embodiment, fiber containing layers within the matrix are separated by alloy containing layers within the matrix.

The invention further includes the method of manufacturing the composite articles by impregnating layers of carbon fibers with a resin to form impregnated sheets, spreading alloy powder between the sheets and compression molding the resulting article at a sufficient temperature and pressure for a sufficient time to melt the alloy and cure the resin.

DETAILED DESCRIPTION OF THE INVENTION

The resin matrix may be either a thermoplastic or thermosetting polymeric material. The polymer is usually an organic polymer but may contain inorganic components, e.g., as in the case of polysiloxanes. Suitable thermoplastic materials may, for example, be linear polyesters, and linear vinyl polymers. Such linear resins usually have molecular weights of from 200,000 to 1,000,000 or higher. Examples of suitable thermosetting resins are cross-linked polyesters, epoxies and melamine-formaldehyde type resins. Such crosslinked resins have what may be referred to as infinite molecular weight. "Cure" as used herein means to crosslink a thermoset resin and to soften and solidify a thermoplastic resin.

The resin, in the case of thermoplastic resins, may be melted and applied over the fibers and alloy. In the case of thermosetting resins, the resin is usually applied in liquid form over the fibers and alloys and then cross-linked to form the composite article. In general, the resin comprises from about 40 to 75 weight percent of the composite.

The carbon fibers may be any suitable carbon fibers, e.g., graphite, and may vary significantly in average diameter and length. The fibers usually have an average diameter of from 0.1 to 100 microns, and preferably from 0.1 to 20 microns. The diameter may commonly be from 1 to 15 microns. The average length of the fiber may vary from about 10 microns, usually from 100 microns, to the length of the article. The preferred fiber has an aspect ratio of at least 4:1 and most preferably is a continuous fiber and thus has a long length relative to the size of the article and may run the entire length of the article.

The tin alloy usually comprises from about 5 to 50 weight percent of the article. The alloy usually contains from about 40 to 100 weight percent tin and from 0 to 60 weight percent lead; however, up to 20 weight percent of other metals such as aluminum, antimony, bismuth, cadmium, copper, gold, indium, lead, mercury, silver, tellurium, and zinc may be present; provided that, the presence of the additional metal does not adversely raise the melting point of the alloy or enter into undesirable reactions during manufacture of the composite or under conditions of use of the composite. Such tin and tin alloys, as described above, are collectively referred to as tin alloys herein.

It is preferred that the alloy melts below the curing temperature of the polymer, so that the compression molding involves the hot pressing of the molten alloy while the polymer cures. We believe that this is partly responsible for the good adhesion between the alloy particles and the polymer matrix. On the other hand, the melting point of the alloy should not be so low that it affects the thermal stability of the composite. Eutectic alloys are often desirable. A tin-lead alloy near the eutectic composition melts just below the curing temperature of suitable resins and is an inexpensive alloy that is widely used as a solder. Therefore, it is well suited for this composite application.

A preferred alloy comprises 60 weight percent tin and 40 weight percent lead.

Even though the tin-lead alloy has a high density, since only a small amount of the alloy is used, the increase in density of the composite is small, e.g., only 20% for an alloy content of 33 wt.% or 4.1 vol.%.

The alloy is usually in particulate form and usually has an average particle size of from 5 to 50 microns.

The preferred composite 10, as shown in FIG. 1, comprises a resin matrix 12 comprising embedded layers of carbon fibers 14 separated by layers of alloy particles 16. The carbon fibers in the fiber layers may be oriented or random. Usually, the alloy particles in the alloy layers are discontinuous, i.e., the particles are generally discrete and only occasionally and randomly touch and are thus not interconnected.

In forming the composite articles of the invention, layers of carbon fibers are impregnated with resin to form impregnated sheets. Alloy powder is then spread upon and sandwiched between the sheets and the article is compression molded at sufficient temperature and pressure for a sufficient time to melt the alloy and cure the resin.

The sufficient temperature is usually from 150° to 300° C., the sufficient pressure is usually from 0.5 to 5 MPa and the sufficient time is usually from 5 to 120 minutes.

The fabrication of the composites of the invention does not involve an additional processing step compared to the fabrication of a conventional carbon fiber composite. This is because the alloy particles just need to be sandwiched by the preimpregnated (prepreg) layers during the lay-up operation. The bonding of the alloy particles and the curing of the polymer resin are achieved in a single step of hot pressing. This also means that the alloy particles may be added at chosen locations in a composite structure during the fabrication of the composite structure. In this way, the beneficial effect of the alloy may be realized with a minimum increase in the overall density of the composite structure.

The following examples illustrate but are not intended to limit the present invention.

EXAMPLES

The carbon fibers used in these examples were graphite, undirectional, continuous, unsized and were in the form of 12,000 (12K)-filament-count tows. They were obtained from Hercules Inc. (Magnamite Graphite Fiber, Type IM6 TM).

The tin-lead alloy was powdered solder of composition 60 wt.% Sn, 40 wt.% Pb, obtained from Taracorp Industries Inc. The average particle size was about 325 mesh (21-25 μm).

Epoxy was used as the binder or matrix. The epoxy was obtained from Dexter Hysol (RE2039, HD3475 TM).

The carbon fibers wound on a cylindrical mold, were impregnated with the epoxy resin and cut to form preimpregnated oriented graphite fiber containing sheets of a size of about 10×18 cms., which were then placed in a pressure mold together with a weighed quantity of alloy powder between all prepreg sheets. Multiple alternating layers of the preimpregnated sheets and 5 g of alloy powder were used, such that the outermost layers were fiber layers. Typical thicknesses of a fiber layer and an alloy layer were respectively 0.36 and 0.18 mm. An alloy layer typically contained 18 vol.% alloy, as calculated from density and layer thickness data. However, the alloy distribution was not uniform throughout the entire thickness of the alloy layer. The alloy amounted up to 37 wt.% of the composite, which was fabricated by compression molding at 185°-200° C. and 1 MPa for 30 min. The heating allowed the alloy to melt while the epoxy cured.

Fatigue testing

Tension-tension fatigue tests were performed on flat un-notched specimens with tension along the fiber direction and at a stress ratio of 0.5 and a frequency of 5 Hz. Each specimen consisted of three layers, namely the two exterior fiber layers and the interior alloy layer. A hydraulic Materials Testing System (MTS) was used. The fatigue life was taken as the number of cycles at which complete fracture took place. It is shown in Table 1 for each test performed. For a similar value of the mean stress, the increase of alloy content from 0 to 33 wt.% increased the fatigue life by over 100 times.

Also shown in Table 1 is the density of each composite. The alloy addition increased the density of the composite. The alloy volume fraction was calculated from the density of the composite compared to that of the composite containing no alloy.

Tensile testing

Tensile testing was carried out using a hydraulic MTS system, with the force parallel to the fibers. The strain was measured by using an extensometer, with a gage length of 1.0 in (2.5 cm). Each specimen consisted of three layers, namely the two exterior fiber layers and the interior alloy layer.

All tensile stress-strain curves were in the form of a straight line all the way to the fracture point. Table 2 shows the tensile strength, modulus and ductility (elongation) for composites containing up to 37 wt.% alloy. Five specimens of each composition were tested. The tensile strength, modulus and ductility were not much affected by the alloy addition. However, the data suggest some slight increases in strength and modulus by the addition of 22.9 or 25.2 wt.% alloy. It is significant that the alloy addition did not degrade the tensile strength or modulus, even though the alloy particles were intrinsically weak. This indicates very good bonding between the alloy particles and the carbon fibers.

Compressive testing

Compressive testing was carried out using a hydraulic MTS system, with the force parallel and perpendicular to the fibers. The strain was measured by the displacement.

For tests with the force parallel to the fibers, each specimen consisted of seven alternating layers, i.e., four fiber layer and three alloy layers. The exposed specimen size was 0.7 ×0.5×0.065 in (1.8×1.3×0.17 cm), so the gage length was 0.7 in (1.8 cm) and the cross-sectional area was 0.032 in$^2$ (0.21 cm$^2$). Four specimens were tested for each composition.

For tests with the force perpendicular to the fibers, each specimen consisted of 23 alternating layers, i.e., 12 fiber layers and 11 alloy layers. The exposed specimen size was 0.56×0.56×0.25 in (1.4×1.4×0.64 cm), so the gage length was 0.25 in (0.64 cm) and the cross-sectional area was 0.31 in² (2.0 cm²). Six specimens were tested for each composition.

All compressive stress-strain curves were in the form of a straight line all the way to the fracture point. Table 3 shows the compressive strength and modulus. The compressive strength and modulus in both force directions were not much affected by the alloy addition. The data suggest some slight decreases in strength and modulus in the direction perpendicular to the fibers due to the alloy addition, but, due to the scatter in the data, the decreases are not significant. On the other hand, it is significant that the alloy addition did not degrade the compressive strength or modulus in the direction parallel to the fibers, as delamination is the cause of failure in this force direction. Hence, this indicates that the alloy addition does not degrade the interlaminar bond strength.

Flexural testing

Flexural testing was performed by three-point bending, with a span of 2.38 in (6.05 cm). A hydraulic MTS system was used.

Table 4 shows the flexural strength and modulus. Each specimen consisted of eleven alternating layers, i.e., six fiber layers and five alloy layers. Seven specimens of each composition were tested. The flexural strength and modulus were not negatively affected by the alloy addition. The data even suggest some slight increases in the flexural strength and modulus due to the alloy addition.

Impact testing

The toughness was investigated by using a Tinius Olsen Model 66 Charpy-Izod Impact Test Machine (ASTM D256). The specimens were notched, with size 0.5×2.5×0.065 in (1.3×6.4×0.17 cm). The notched impact strength is shown in Table 5 for two compositions. Each specimen consisted of seven alternating layers, i.e., four fiber layers and three alloy layers. Seven specimens were tested for each composition. The notched impact strength was not negatively affected by the alloy addition. The data in fact suggest some increase of the notched impact strength due to the alloy addition.

Damping testing

Damping was tested by using a Bruel and Kjaer apparatus. The loss factors were measured by the resonance peak half-width value method. The widths of the flexural resonance frequencies in a cantilever beam sample at 3 dB from the peak amplitudes were measured and the loss factors were calculated from 3 dB widths ($f_n$) divided by resonance frequencies ($f_n$). The samples were of dimensions 7.0×0.5×0.03 in (free length=6.25 in rather than 7.0 in). An impulse force was applied to one of the two largest faces of the sample near its end by using a human finger. Each specimen consisted of three alternating layers, i.e., two fiber layers and one alloy layer. At least five readings were taken for each specimen.

Table 6 shows the loss factors obtained. The loss factor was not affected by the alloy addition.

Electrical resistivity testing

The electrical resistivity was measured by using the fourprobe method. Electrical contacts were made with silver paint. Each specimen consisted of three layers, i.e., two fiber layers and one alloy layer. At least ten readings were taken for each specimen. Table 7 shows the results. The electrical resistivity increased with increasing alloy content. This is consistent with the discontinuous nature of the alloy particles. Although the alloy melted during composite fabrication, the particles remained discontinuous. This conclusion is also supported by scanning electron microscopic observation.

Electromagnetic interference (EMI) shielding effectiveness

Metal particles are frequently added to polymer-matrix composites for the purpose of increasing the EMI shielding effectiveness, which was therefore measured.

The coaxial cable method was used. The set-up consisted of a shielding effectiveness tester (Elgal SET 29A ™), which was connected with a coaxial cable to a sweep signal generator (10-2500 MHz) (Wavetek 2002ATM) on one side and on the other side to a variable attenuator, 0-50 dB, ±0.1 dB (Alfred Electronics E101 ™), followed by a crystal detector (Hewlett Packard 423A ™) and then by a DC voltmeter. The crystal detector served to convert the signal to a voltage.

Each specimen was in the form of an annular disc, with an outside diameter of 97.4 mm and an inside diameter of 28.8 mm. Conductive silver paint was applied to the inner surface of the center hole of the specimen and to the flat surfaces of the specimen to a width of 5.1 mm from the inner rim of the annular disc, in order to allow a continuous metallic contact to be made between the sample and the steel tubing in the center of the tester. Moreover, silver paint was applied to the flat surfaces of the specimen to a width of 3.7 mm from the outer rim of the annular disc in order to allow a continuous metallic contact to be made between the sample and the steel chamber of the tester.

In the measurement, after inserting the specimen in the tester, the variable attenuator was set to zero and the voltmeter was read. Then the specimen was removed from the tester and the variable attenuator was adjusted until the voltmeter had the same value as the case with the specimen in the tester. The reading of the adjusted attenuator gave the attenuation, which described the shielding effectiveness.

Each specimen consisted of three layers, i.e., two fiber layers and one alloy layer. At least four readings were taken for each specimen at each frequency.

Table 8 shows the results. The shielding effectiveness at each frequency was decreased slightly by the alloy addition. This is consistent with the increased electrical resistivity due to the alloy addition and is also consistent with the fact that continuous carbon fibers are highly effective for shielding.

Scanning electron microscopy

Scanning electron microscopy (SEM) was used to examine the fracture surfaces after various mechanical tests.

FIG. 2 shows the fracture surface after tensile testing of a composite containing 22.9 wt.% alloy (1.8 vol.% alloy). The composite consisted of three layers, i.e., two fiber layers and one alloy layer. The density of the composite was 1.589 g/cm³. FIG. 2(a) shows a low magnification image of almost the entire cross-sectional thickness of the specimen. The brighter strip which stretches horizontally near the center of the photograph is the layer containing the alloy particles, which appear as round particles of diameter much larger than the fiber diameter. The tips of fibers were observed elsewhere throughout the photograph. The alloy particles are shown more clearly in the high magnification image in FIG. 2(b). The particles were partially covered by the polymer matrix, indicating good adhesion between the alloy particles and the polymer matrix. The average particle size was 23 μm. The pattern on the surface of each alloy particle is associated with the eutectic structure of the alloy.

Figure 3:
FIG. 3 shows a fracture surface after tensile testing of a composite of the invention containing 22.9 wt.% alloy (1.8 vol.% alloy).

The fracture mechanism is revealed more clearly by FIG. 3, which is the tensile fracture surface of the same composite as FIG. 2. Fracture began in the matrix. Some fiber pull-out occurred. Some of the alloy particles fell out from the fracture surface.

FIG. 4 shows the fracture surface after fatigue failure of a composite containing 32.9 wt.% alloy (4.1 vol.% alloy). The density was 1.753 g/cm$^3$. FIG. 4(a) shows a part of the middle layer, i.e., the layer containing alloy particles. The alloy particles were held together by the polymer matrix. FIG. 4(b) shows a region containing fibers. The polymer matrix between the fibers cracked and then the cracks enlarged. Eventually, the fibers broke. The three large round features along a horizontal line near the center of FIG. 4(b) are the tips of the fibers.

Figure 5:
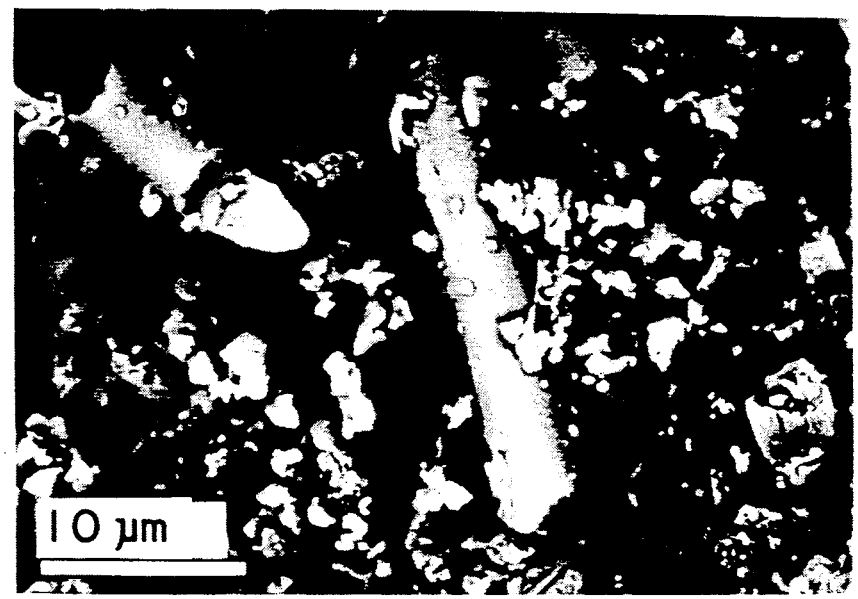
FIG. 5 shows a fracture surface after impact testing of a composite of the invention containing 25 wt.% alloy (5.8 vol.% alloy).

FIG. 5 shows the fracture surface after impact testing. The composite contained 25 wt.% alloy (5.8 vol.% alloy) and consisted of seven layers, i.e., four fiber layers and three alloy layers. The density was 1.749 g/cm$^3$. Both the matrix and the fibers were broken.

These examples demonstrate that the addition of tin-lead (60 wt.% Sn) alloy particles (about 21-25 μm in diameter) between continuous carbon fiber layers in an epoxy-matrix composite can improve the fatigue life by over 100 times. The alloy amounted up to 37 wt.% (7.2 vol.%) of the composite. For a composite containing 33 wt.% (4.1 vol.%) alloy, the fatigue life was $6.8 \times 10^5$ cycles at a mean stress of 510 MPa, a load ratio of 0.5 and a frequency of 5 Hz, compared to a corresponding life of $4.0 \times 10^3$ cycles for a composite containing no alloy and tested at a mean stress of 530 MPa. This amount of alloy increased the density of the composite from 1.46 to 1.75 g/cm$^3$. In general, the alloy condition has little negative and often some positive effect on the tensile strength, tensile modulus, compressive strength, and compressive modulus (with the compressive force parallel and perpendicular to the fibers), but it increased the electrical resistivity.

TABLE 1

| | | Fatigue life | | |
|---|---|---|---|---|
| Wt. % alloy | Vol. % alloy | Density (g/cm$^3$) | Mean stress (MPa) | Fatigue life (cycles) |
| 0 | 0 | 1.461 | 530 | $4.0 \times 10^3$ |
| 29.6 | 2.1 | 1.609 | 568 | $3.8 \times 10^4$ |
| 33 | 4.1 | 1.753 | 510 | $6.8 \times 10^5$ |
| 0 | 0 | 1.461 | 639 | $1.0 \times 10^2$ |
| 33 | 4.1 | 1.753 | 643 | $1.2 \times 10^4$ |
| 23 | 1.8 | 1.589 | 564 | $>4.7 \times 10^5$ |
| 18.2 | 2.0 | 1.599 | 405 | $9.5 \times 10^5$ |
| 15.4 | 1.2 | 1.545 | 474 | $>4.0 \times 10^5$ |

TABLE 2

| | | Tensile test results | | | |
|---|---|---|---|---|---|
| Wt. % alloy | Vol. % alloy | Density (g/cm$^3$) | Strength (MPa) | Modulus (GPa) | Ductility (%) |
| 0 | 0 | 1.461 | 867 (±129) | 69 (±35) | 1.0 |
| 22.9 | 1.8 | 1.589 | 914 (±190) | 79 (±14) | 1.2 |
| 25.2 | 2.7 | 1.650 | 961 (±82) | 77 (±8) | 1.3 |
| 36.9 | 7.2 | 1.970 | 729 (±113) | 70 (±10) | 1.3 |

TABLE 3

| | | Compressive test results | | | |
|---|---|---|---|---|---|
| Force direction | Wt. % alloy | Vol. % alloy | Density (g/cm$^3$) | Strength (MPa) | Modulus (GPa) |
| Parallel to fibers | 0 | 0 | 1.334 | 183 ± 23 | 1.2 ± 0.1 |
| | 31.7 | 4.2 | 1.636 | 173 ± 35 | 1.2 ± 0.4 |
| Perpendicular to fibers | 0 | 0 | 1.281 | 131 ± 3 | 5.7 ± 1.5 |
| | 26 | 5.1 | 1.647 | 129 ± 1 | 4.1 ± 1 |

TABLE 4

| | | Flexural test results | | |
|---|---|---|---|---|
| Wt. % alloy | Vol. % alloy | Density (g/cm$^3$) | Strength (GPa) | Modulus (MPa) |
| 0 | 0 | 1.363 | 7.9 ± 1.3 | 240 ± 38 |
| 26.8 | 5.4 | 1.751 | 9.1 ± 0.8 | 295 ± 39 |

TABLE 5

| | | Impact test results | |
|---|---|---|---|
| Wt. % alloy | Vol. % alloy | Density (g/cm$^3$) | Notched impact strength (ft · lb/in$^2$) |
| 0 | 0 | 1.334 | 35 (±4) |
| 25 | 5.8 | 1.749 | 41 (±6) |

TABLE 6

| | | Damping test results | |
|---|---|---|---|
| Wt. % alloy | Vol. % alloy | Density (g/cm$^3$) | Loss factor |
| 0 | 0 | 1.461 | 0.02 |
| 33 | 4.1 | 1.753 | 0.02 |

TABLE 7

| | | Electrical resistivity | |
|---|---|---|---|
| Wt. % alloy | Vol. % alloy | Density (g/cm$^3$) | Electrical resistivity (Ω · cm) |
| 0 | 0 | 1.460 | $4.1 \times 10^{-3}$ |
| 22.9 | 1.8 | 1.589 | $1.0 \times 10^{-2}$ |
| 29.6 | 2.1 | 1.609 | $1.3 \times 10^{-2}$ |

TABLE 8

| | | EMI shielding effectiveness | | | |
|---|---|---|---|---|---|
| Wt. % alloy | Vol. % alloy | Density (g/cm$^3$) | Thickness (cm) | Frequency (GHz) | Shielding effectiveness (dB) |
| 0 | 0 | 1.332 | 0.08 | 1.0 | 16.0 |
| | | | | 1.3 | 15.3 |
| | | | | 1.5 | 16.2 |
| | | | | 2.3 | 20.2 |
| 34.2 | 1.4 | 1.436 | 0.10 | 1.0 | 13.6 |
| | | | | 1.3 | 13.4 |
| | | | | 1.5 | 15.5 |
| | | | | 2.3 | 18.0 |

What is claimed is:

1. A composite article comprising resin matrix containing carbon fibers and a tin alloy contained within the composite in the form of particles in discontinuous layers.

2. The composite of claim 1 wherein the alloy is a tin-lead alloy.

3. The composite article of claim 1 wherein the resin is a thermosetting resin.

4. The composite article of claim 3 wherein the alloy comprises from 5 to 50 weight percent of the article.

5. The composite article of claim 4 wherein the carbon fibers comprise from about 20 to 50 weight percent of the article.

6. The composite article of claim 3 wherein alloy is in the form of particles of from 5 to 50 microns in average particle size.

7. The composite article of claim 3 wherein the fiber has an aspect ratio of at least 4:1, an average diameter of from 0.1 to 100 microns and an average length of from 10 microns to the length of the article.

8. The composite of claim 1 wherein the resin is epoxy resin.

9. The composite of claim 1 wherein the fibers are contained within the composite in the form of layers.

10. The composite of claim 9 wherein the fiber containing layers are separated by the alloy containing layers.

11. The composite article of claim 10 wherein the fibers are graphite fibers.

12. The composite of claim 1 wherein the fibers are graphite fibers having an average diameter of from 0.1 to 20 microns.

13. A method of manufacturing the composite articles of claim 1 which comprises impregnating layers of carbon fibers with a resin to form impregnated sheets, spreading a tin alloy powder between the sheets and compression molding the resulting article at a sufficient temperature and pressure for a sufficient time to melt the alloy and cure the resin.

14. The method of claim 13 wherein the temperature is from 150° to 300° C., the pressure is from 0.5 to 5 MPa and the time is from 5 to 120 minutes.

15. The method of claim 13 wherein the resin is epoxy resin.

16. The method of claim 14 wherein the resin is epoxy resin.

* * * * *